United States Patent
Hirata

(10) Patent No.: US 11,169,355 B2
(45) Date of Patent: Nov. 9, 2021

(54) LENS UNIT

(71) Applicant: MAXELL, LTD., Kyoto (JP)

(72) Inventor: Hiroyuki Hirata, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 16/606,015

(22) PCT Filed: May 11, 2018

(86) PCT No.: PCT/JP2018/018288
§ 371 (c)(1),
(2) Date: Oct. 17, 2019

(87) PCT Pub. No.: WO2018/207909
PCT Pub. Date: Nov. 15, 2018

(65) Prior Publication Data
US 2021/0141291 A1    May 13, 2021

(30) Foreign Application Priority Data

May 12, 2017  (JP) .............................. JP2017-095285

(51) Int. Cl.
*G02B 7/02*        (2021.01)
*G03B 17/12*       (2021.01)
*B60R 11/04*       (2006.01)

(52) U.S. Cl.
CPC .............. *G02B 7/021* (2013.01); *B60R 11/04* (2013.01); *G03B 17/12* (2013.01)

(58) Field of Classification Search
None
See application file for complete search history.

(56) References Cited

U.S. PATENT DOCUMENTS

| 6,847,431 B2* | 1/2005 | Coon ................... G03F 7/70933 |
| | | 355/30 |
| 7,515,202 B2* | 4/2009 | Saito .................... H04N 5/2253 |
| | | 348/374 |
| 2016/0349475 A1 | 12/2016 | Horiuchi et al. |

FOREIGN PATENT DOCUMENTS

| CN | 203350513 U | 12/2013 |
| CN | 103345035 B |  8/2016 |

(Continued)

OTHER PUBLICATIONS

Aug. 7, 2018 International Serach Report issued in International Application No. PCT/JP2018/018288.

(Continued)

*Primary Examiner* — Clayton E. LaBalle
*Assistant Examiner* — Leon W Rhodes, Jr.
(74) *Attorney, Agent, or Firm* — Oliff PLC

(57) ABSTRACT

A lens unit capable of checking the airtightness of a seal member between an object side lens and an inner circumferential surface of a lens barrel. A part of an end portion of an air hole on the object side is opened radially inward from the inner circumferential surface of the lens barrel, and at least part of the end portion of the air hole on the image side is opened. When the image side lens is in close contact with the lens installation surface of the flange portion, the air fills the lens barrel through the air hole. The seal member provided between the object side lens and the inner circumferential surface of the lens barrel is damaged or it's not attached to a predetermined position from the beginning, it's still possible to measure air leakages, thus rendering it possible to exactly check the airtightness of the seal member.

4 Claims, 4 Drawing Sheets

(56) References Cited

FOREIGN PATENT DOCUMENTS

| | | | |
|---|---|---|---|
| JP | 2006-292927 A | | 10/2006 |
| JP | 2008-233512 A | | 10/2008 |
| JP | 2010-281962 A | | 12/2010 |
| JP | 2011101091 A | * | 5/2011 |
| JP | 2015-031926 A | | 2/2015 |
| JP | 2015-068842 A | | 4/2015 |
| JP | 2015068842 A | * | 4/2015 |
| WO | 2008/093463 A1 | | 8/2008 |

OTHER PUBLICATIONS

Apr. 2, 2021 Office Action issued in Chinese Patent Application No. 201880029873.1.
Jan. 26, 2021 Extended Search Report issued in European Patent Application No. 18799139.3.

* cited by examiner

[Fig 1]
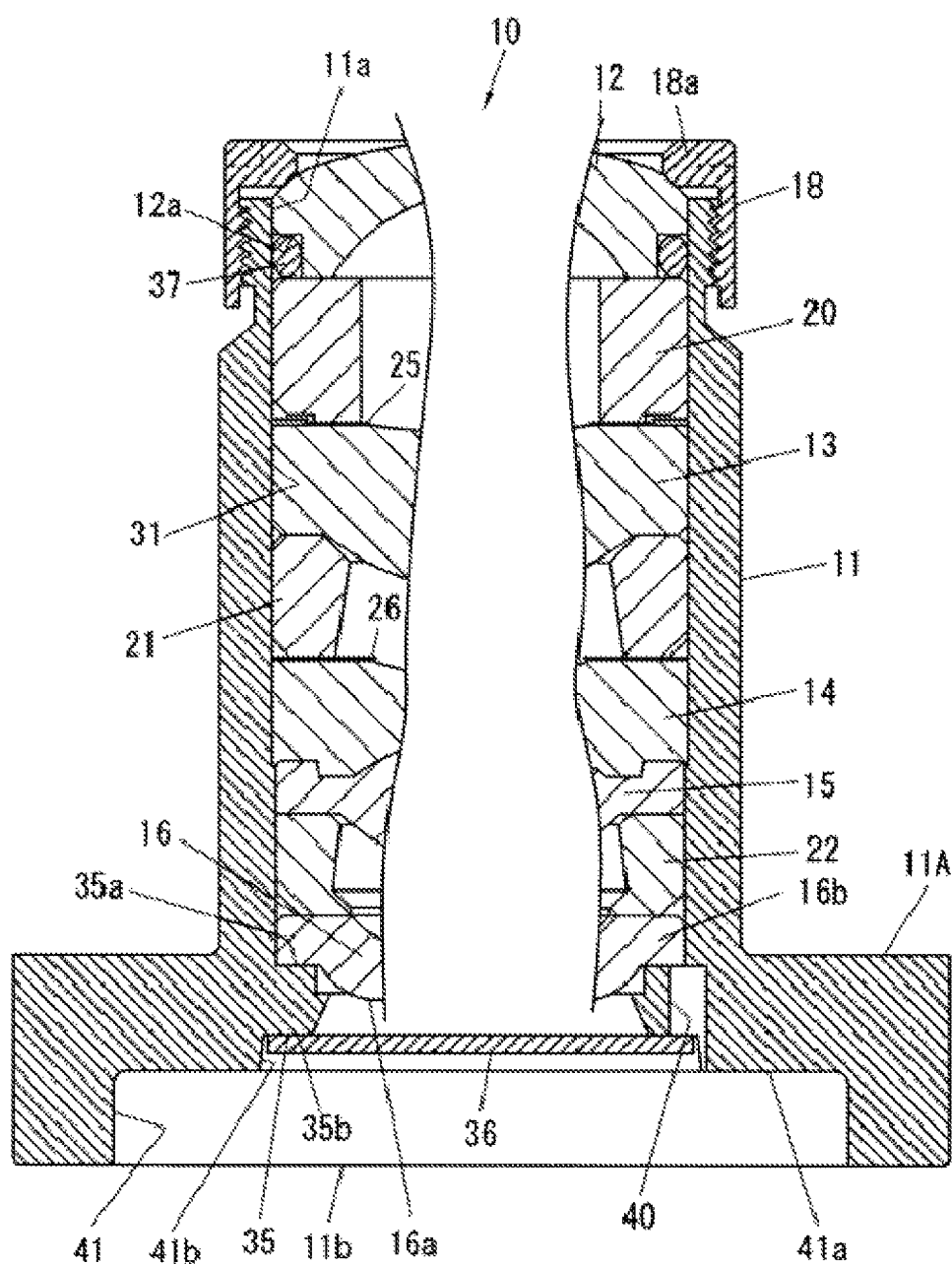

[Fig.2]
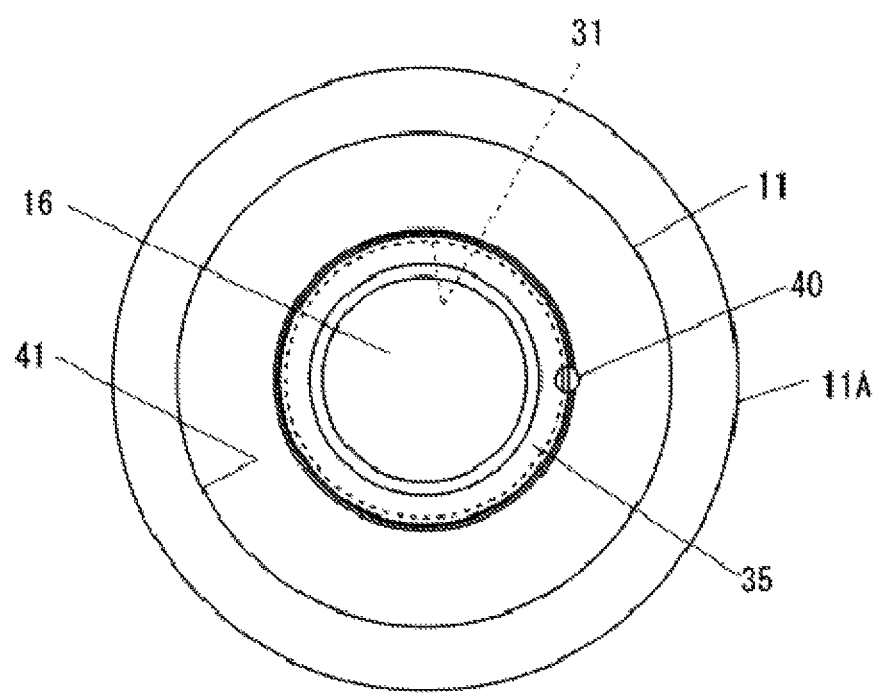

[Fig.3]
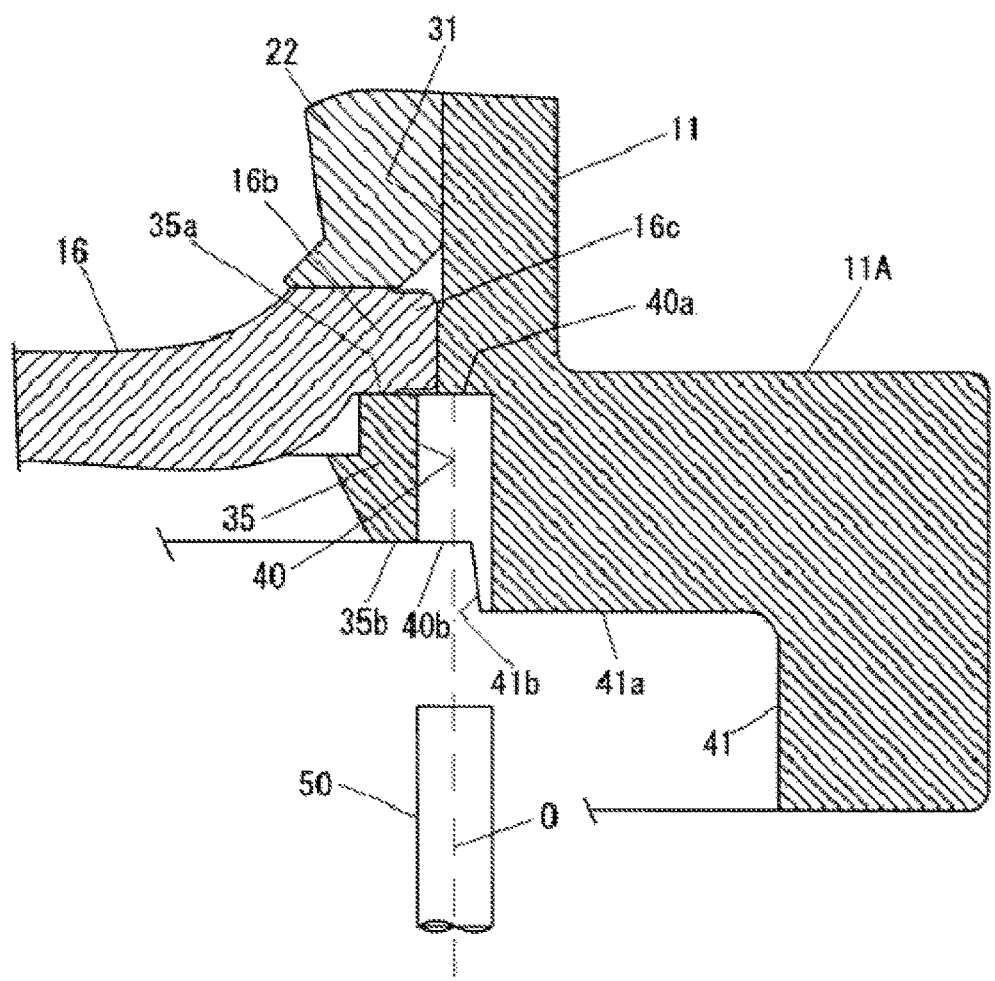

[Fig.4]
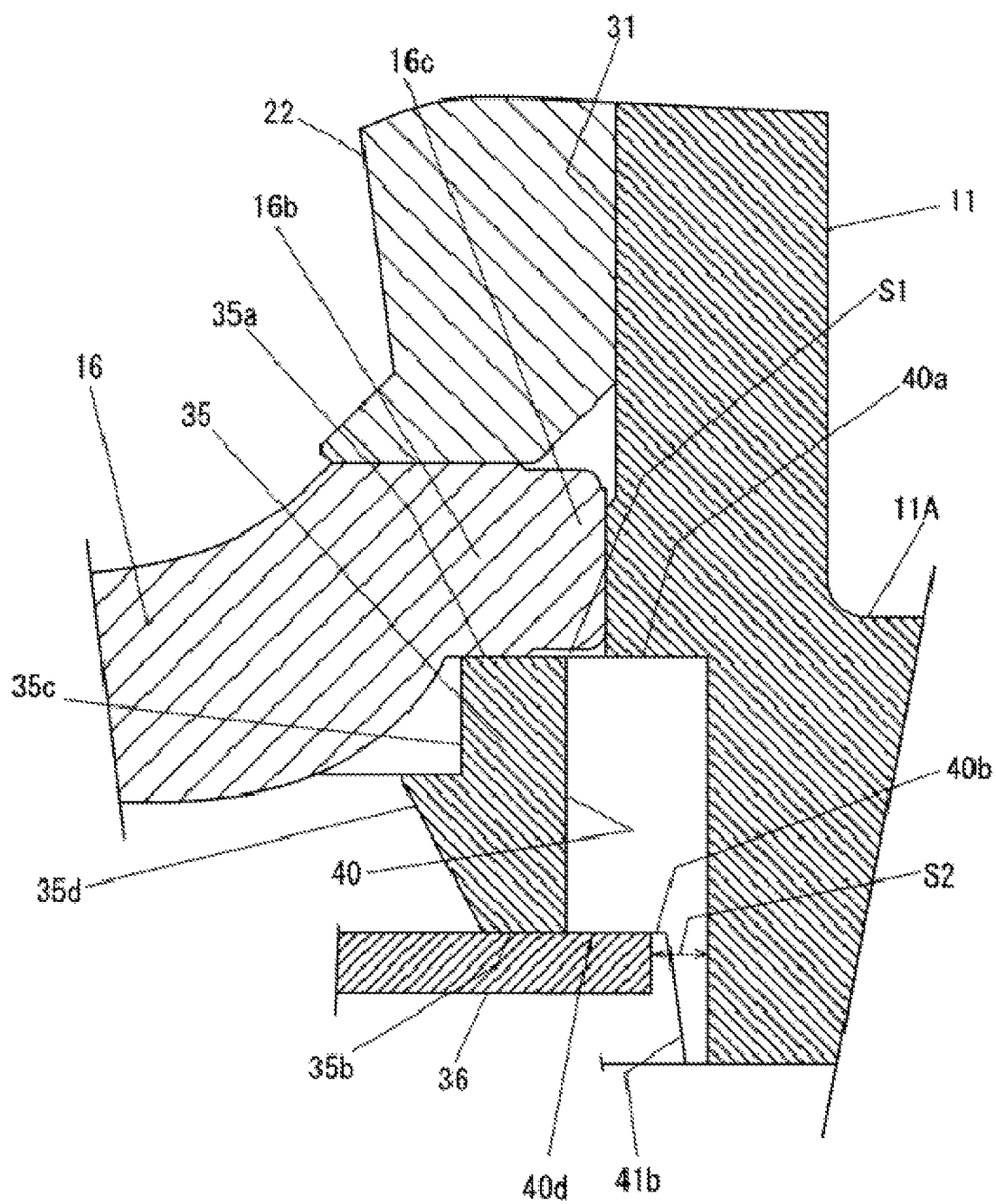

LENS UNIT

TECHNICAL FIELD

The present invention relates to a small lens unit provided in an in-vehicle camera mounted on a vehicle such as an automobile.

BACKGROUND ART

In recent years, a monitor is mounted on a car for car navigation or the like. Accordingly, as a back monitor system, an image taken by an in-vehicle camera mounted on the back of the vehicle is displayed on the monitor. Also, a system has been developed in which camera is provided not only on the back, but also on the front, rear, left, and right sides of the vehicle, so that images overlooking the surrounding areas of the vehicle can be synthesized and displayed on a monitor in a substantially real time.

Regarding an in-vehicle camera having a sensing function capable of accurately and quickly recognizing an image of an obstacle or a person, a lens unit is made by using a metal mirror cylinder formed by processing a metal material such as brass or aluminum alloy with a high precision, thus realizing a high reliability in monitoring (for example, see Patent Document 1).

In such a lens unit, a plurality of lenses are arranged in a cylindrical metal barrel along the optical axis direction thereof, forming a group of lenses located within the cylindrical metal barrel.

Further, in such a lens unit, in order to prevent water or dust from invading through an opening on the object side of the lens barrel, a seal member such as an O-ring is provided as means for ensuring an airtightness from the object side for the lens barrel, and such an O-ring is disposed between an object side lens (located closest to the object side) and the inner circumferential surface of the lens barrel.

Moreover, the lens barrel has a flange portion on the inner circumferential surface near an end thereof on the image side, and an image side lens is provided on the flange portion and positioned closest to the image side among the plurality of lenses.

CITATION LIST

Patent Document

Patent Document 1: Japanese Patent Application Laid-Open No. 2006-292927.

SUMMARY OF THE INVENTION

Technical Problems

In manufacturing the lens unit as described above, an inspection for checking is usually performed on the airtightness of the seal member provided between the object side lens and the inner circumferential surface of the lens barrel.

This airtightness checking is performed by filling the interior of the lens barrel with air and by measuring an air leakage flow rate. For example, after the opening on the image side of the lens barrel is sealed with a closing member, the interior of the lens barrel is filled with air, and a measurement is performed on the air leakage flow rate of the filled air toward the outside of the lens barrel.

Usually, since only a slight gap is formed between the lens in the lens barrel and the inner circumferential surface of the lens barrel, it is possible to introduce air to fill the whole inner space of the lens barrel.

However, since the image side lens is disposed on the flange portion on the inner circumferential surface near the end of the lens barrel, and since this flange portion is also processed to become flat with a high processing precision at the same level as the lens barrel, the outer peripheral edge of the image side lens may be in a close contact with the flange portion.

When the outer peripheral edge of the image side lens is in a close contact with the flange portion in this way, an airtightness of an unintended portion will occur due to the close contact portion. On the other hand, since the air filled is sealed by the close contact portion, if the above-described seal member is damaged or it is not attached at all or not attached to a predetermined position, it will be difficult to measure an air leakage, making it difficult to perform an airtightness test.

The present invention has been accomplished in view of the above circumstances, and it is an object of the present invention to provide a lens unit capable of exactly checking the airtightness of a seal member provided between an object side lens and an inner circumferential surface of a lens barrel.

Solution the Problems

In order to solve the aforementioned problems, provided herewith is a lens unit including: a plurality of lenses arranged along an optical axis; a lens barrel in which the plurality of lenses are housed; a seal member provided between the inner circumferential surface of the lens barrel and an object side lens positioned closest to the object side among the plurality of lenses, wherein:
  the lens barrel has an annular flange portion projecting radially inward on the inner circumferential surface of an end portion of the lens barrel on the barrel's image side;
  an image side lens located closest to the image side among the plurality of lenses is installed on a lens installation surface facing the object side on the flange portion;
  the lens barrel is provided with an air hole covering a part of the flange portion;
  apart of an end portion of the air hole on the object side is opened radially inward from the inner circumferential surface of the lens barrel;
  at least a part of the end portion of the air hole on the image side is opened.

In the present invention, a part of an end portion of an air hole (including a flange portion and provided in the barrel) on the object side is opened radially inward from the inner circumferential surface of the lens barrel, and at least part of the end portion of the air hole on the image side is also opened. In this way, even if the image side lens is in close contact with the lens installation surface of the flange portion, the air can still be introduced to exactly fill the lens barrel through the air hole. Therefore, even if the seal member provided between the object side lens and the inner circumferential surface of the lens barrel is damaged or it is not attached at all or not attached to a predetermined position from the beginning, it is possible to exactly measure an air leakage, thus making it possible to exactly check the airtightness of the seal member.

Based on the above configuration of the present invention, an optical filter is installed on the filter installation surface facing the image side on the flange portion;

a part of the outer peripheral edge of the filter is disposed at the opening of the air hole on the image side;

a gap is formed between the outer peripheral edge of the optical filter and the inner circumferential surface of the air hole.

According to such a configuration, when the optical filter is attached to the filter installation surface using an adhesive, it is possible to cause an outgas of the adhesive to be released to the outside of the lens barrel through the gap. Therefore, it is possible to prevent a fogging on the inner surface of the optical filter which would otherwise occur due to the outgas.

Effects of the Invention

According to the present invention, it is possible to exactly check the airtightness of the seal member provided between the object side lens and the inner circumferential surface of the lens barrel.

BRIEF DESCRIPTION OF THE DRAWINGS

FIG. 1 is a schematic sectional view showing a lens unit according to an embodiment of the present invention.

FIG. 2 is a bottom view of the end surface of the lens unit on the image side.

FIG. 3 is an enlarged cross-sectional view showing an important portion of the lens unit.

FIG. 4 is an enlarged view of the important portion shown in FIG. 3.

DESCRIPTION OF EMBODIMENTS

Hereinafter, embodiments of the present invention will be described with reference to the drawings.

The lens unit of the present embodiment is provided in an in-vehicle camera mounted on a vehicle such as an automobile.

As shown in FIG. 1, the lens unit 10 according to the present embodiment includes a substantially cylindrical lens barrel 11 and a lens group including a plurality of (five) lenses 12-16 arranged within the lens barrel 11. The lens barrel 11 has a large-diameter portion 11A, which has a diameter larger than that of the lens barrel 11, at the end of the lens barrel on the image side (lower side in FIG. 1).

In the following description, the lens 12 positioned closest to the object side (upper side in FIG. 1) is referred to as an object side lens 12, and the lens 16 positioned closest to the image side (lower side in FIG. 1) is referred to as an image side lens 16. Further, in FIG. 1, the lenses 12-16 are shown partially broken.

The plurality of lenses 12-16 provided in the lens barrel 11 are arranged in a state in which the respective optical axes coincide with each other, and the respective lenses 12-16 are arranged along the optical axis, thus forming a group of lenses for use in imaging. Accordingly, in the following description where optical axis is described, the optical axis of each of the lens 12-16 is shown and the optical axis of the lens group is also indicated. Further, the optical axis and the axis of the lens barrel 11 are coaxial.

The lens barrel 11 is a cylindrical member that is open at both ends, has an opening 11a at one end on the object side (upper side in FIG. 1), and another opening 11b at the other end on the image side (lower side in FIG. 1). In addition, the opening 11b is formed on the lower surface of the large diameter portion 11A.

A male screw portion is formed on the outer peripheral surface of the object side end of the lens barrel 11, and a female screw portion formed on the inner circumferential surface of a lens pressing member 18 is screwed onto the male screw portion. Accordingly, the lens pressing member 18 can be attached to the end of the lens barrel 11 on the object side. Here, the lens pressing member 18 has a pressing portion 18a that protrudes inwardly. The pressing portion 18a presses the outer peripheral portion of the upper surface of the object side lens 12, thereby preventing the object side lens 12 from leaving the lens barrel 11.

A cylindrical accommodating portion 31 is formed inside the lens barrel 11, and the lenses 12-16 are housed in the accommodating portion 31. The lens 12 and the lens 13 are arranged with a predetermined interval in the optical axis direction and with their outer peripheral surfaces in contact with the inner circumferential surface of the accommodating portion 31. Further, an intermediate ring 20 is accommodated in the accommodating portion 31 between the lens 12 and the lens 13 in a state where the outer peripheral surface of the intermediate ring 20 is in contact with the inner circumferential surface of the accommodating portion 31.

Further, the lens 14 and the lens 16 are received in the accommodating portion 31, with a predetermined interval in the optical axis direction in a state where the outer peripheral surfaces thereof are in contact with the inner circumferential surface of the accommodating portion 31.

Moreover, an intermediate ring 21 is provided in the accommodating portion 31 between the lens 13 and the lens 14, and another intermediate ring 22 is accommodated between the lens 15 and the lens 16, with the outer peripheral surface thereof abutting against the inner circumferential surface of the accommodating portion 31.

The lenses 14, 15 are two mutually bonded lenses, and the lens surface (on the image side) of the lens 15 is disposed inside the intermediate ring 22.

The accommodating portion 31 is provided with a diaphragm member 25 between the intermediate ring 20 and the lens 13, and another diaphragm member 26 is provided between the intermediate ring 21 and the lens 14, with the outer peripheral parts of these diaphragm members 25, 26 in contact with the inner circumferential surface of the accommodating portion 31.

Further, as shown in FIGS. 1-4, the lens barrel 11 has an annular flange portion 35 projecting radially inward and formed on the inner circumferential surface of the barrel's end portion on the image side. The flange portion 35 is formed integrally with the large diameter portion 11A, such that it protrudes radially inward from the inner circumferential surface of the large diameter portion 11A of the lens barrel 11. The image side lens 16 positioned closest to the image side is disposed on a lens installation surface 35a facing the object side on the flange portion 35. The lens installation surface 35a is an annular flat surface orthogonal to the optical axis, and a flange portion 16b of the outer peripheral surface of the image side lens 16 is installed on the lens installation surface 35a.

Further, the inner circumferential surface of the flange portion 35 is constituted by a cylindrical surface 35c and a conical cylindrical surface 35d (truncated conical cylindrical shaped) adjacent to the cylindrical surface 35c and coaxial with the cylindrical surface 35c. The inner diameter of the conical cylindrical surface 35d on the object side (upper end side) is smaller than the inner diameter of the cylindrical surface 35c, having a diaphragm function. Moreover, the inner diameter of the conical cylinder surface 35d on the image side (lower end side) is larger than the inner diameter of the cylindrical surface 35c.

An infrared cut filter (optical filter) 36 is disposed on a filter installation surface 35b facing the image side (lower side in FIG. 1) on the flange portion 35.

As shown in FIG. 1, the object side lens 12 is a glass lens, and a seal member 37 is interposed between the object side lens 12 and the inner circumferential surface of the lens barrel 11. Namely, a notch 12a having a rectangular cross section is formed along the circumferential direction on the outer peripheral surface of the object side lens 12 on the image side. An O-ring 37 serving as a seal member 37 is fitted into the notch 12a, so that the seal member 37 is in close contact with the inner circumferential surface of the lens barrel 11, the upper surface of the intermediate ring 20, and the L-shaped wall surface of the notch 12a.

The lens 13 is a glass lens, and the lenses 14, 15 are resin lenses. The lenses 14, 15 are two mutually bonded lenses coaxial with the optical axis The image side lens 16 is a resin lens, having a flange portion 16b on the outer peripheral portion thereof. The flange portion 16b is installed on the installation surface 35a of the flange portion 35 as described above. Here, the lens surface 16a on the image side of the image side lens 16 is disposed inside the flange portion 35.

When the lenses 12-16, the intermediate rings 20-22, and the diaphragm members 25, 26 are accommodated into the lens barrel 11, the image side lens 16 is at first inserted into the accommodating portion 31 through the opening 11a of the lens barrel 11. The flange portion 16b of the image side lens 16 is installed on the lens installation surface 35a of the flange portion 35.

Next, the intermediate ring 22, the two mutually bonded lenses 14-15, the diaphragm member 26, the intermediate ring 21, the lens 13, the diaphragm member 25, the intermediate ring 20, and the object side lens 12 are inserted in this order respectively into the accommodating portion 31. Here, members including the intermediate ring 22, the two laminated lenses 14-15, the diaphragm member 26, the intermediate ring 21, the lens 13, the diaphragm member 25, the intermediate ring 20, the object side lens 12, mutually adjacent to each other along the optical axis are in mutual contact with each other. In addition, a seal member 37 is fitted in advance into the notch 12a of the object side lens 12.

Finally, the lens pressing member 18 is screwed onto and tightened upon the object side end of the lens barrel 11, and the lenses 12-16, the intermediate rings 20-22, and the diaphragm members 25, 26 are thus clamped and fixed therein by the lens pressing member 18 and the flange portion 35.

In this way, the lenses 12-16, the intermediate rings 20-22, and the diaphragm members 25, 26 can be accommodated and fixed into the accommodating portion 31 of the lens barrel 11.

Further, the infrared cut filter (optical filter) 36 is installed on the filter installation surface 35b of the flange portion 35, and bonded thereon using an adhesive. On the other hand, the bonding of the infrared cut filter 36 may be performed after or before the lenses 12-16, the intermediate rings 20-22 and the diaphragm members 25, 26 are accommodated into the lens barrel 11. Such a bonding performed after drilling an air hole which will be discussed later.

When manufacturing the lens unit 10 as described above, in order to exactly check the airtightness of the seal member 37 provided between the object side lens 12 and the inner circumferential surface of the lens barrel 11, the present embodiment is such that the air hole 40 extending in the thickness direction of the flange portion 35 is formed in the large diameter portion 11A of the lens barrel 11.

That is, as shown in FIG. 3, a hole 41 having an inner diameter larger than the inner diameter of the accommodating portion 31 is formed on the lower surface of the large-diameter portion 11A. A truncated cone-shaped hole 41b is formed on the bottom surface 41a of the hole 41. The upper end periphery of the hole 41b is connected to the outer periphery of the filter installation surface 35b of the flange portion 35.

Then, using a drilling tool 50 such as a drill or an end mill, the large-diameter portion 11A is drilled from the bottom surface 41a including a portion slightly on the outer peripheral side from the inner circumferential edge of the bottom surface 41a. Further, the air hole 40 is formed by drilling from the filter installation surface 35b to the lens installation surface 35a of the flange portion 35. When drilling with the drilling tool 50, the rotation center O of the drilling tool 50 is shifted radially outward from the inner circumferential surface of the accommodating portion 31 of the lens barrel 11, while the hole drilling is performed from the bottom surface 41a through the filter installation surface 35b up to the lens installation surface 35a, using the hole drilling tool 50

A part of the object side end 40b of the air hole 40 formed as above described is opened on the radially inner side from the inner circumferential surface of the accommodating portion 31 of the lens barrel 11. Namely, as shown in FIGS. 3, 4, the end surface of the end portion 40a of the air hole 40 is flush with the lens installation surface 35a, and a part of the end surface is opened on the radially inner side from the inner circumferential surface of the accommodating portion 31 of the lens barrel 11. Further, an end 40b (on the image side) of the air hole 40 is opened. Namely, the end face of the end 40b (on the image side) of the air hole 40 is opened, and a part of the lower end of the air hole 40 is opened with extending to the bottom face 41a.

Therefore, even if the flange portion 16b of the image side lens 16 is unintentionally in close contact with the lens installation surface 35a, an air passing through the air hole 40 can flow passing a slight gap between the outer peripheral surface of the flange portion 16b and the inner circumferential surface of the accommodating portion 31.

Further, the flange portion 16b has a thin portion 16c having a slightly smaller thickness on the outer peripheral portion thereof, and a portion closer to the inner diameter side than the thin portion 16c is disposed on the lens installation surface 35a. In this way, a gap S1 is formed between the lower surface (image side surface) of the thin portion 16c and the lens installation surface 35a. Therefore, an air flowing upward (toward object side) through the air hole 40 can flow into the gap S1 and can also flow from this gap, passing through a gap between the outer peripheral surface of the flange portion 16b and the inner circumferential surface of the accommodating portion 31.

A part of the outer peripheral edge of the infrared cut filter (optical filter) 36 installed on the filter installation surface 35b is disposed in the image side opening 40d of the air hole 40, while a gap S2 is formed between the inner circumferential surface of the opening 40d and the outer peripheral edge of the infrared cut filter 36.

The infrared cut filter 36 is affixed to the filter installation surface 35b using an adhesive, but outgas emitted from the adhesive during the affixing operation escapes out of the lens barrel 11 through the gap S2.

The lens unit 10 having such a configuration should have the airtightness of its seal member 37 checked at the time of manufacturing. Such a checking is performed after the opening 11b on the image side of the lens barrel 11 is sealed by a closing member (not shown), followed by filling the lens barrel 11 with air, and measuring an air leakage of the filled air outside the lens barrel.

In the lens unit 10 of the present embodiment, a part of one end face 40a of the end portion (on the object side) of the air hole 40 (formed in the lens barrel 11 including the flange portion 35 and extending in the thickness direction of the flange portion 35) is opened on the radially inner side than the inner circumferential surface of the lens barrel 11, while the end surface 40b of the end portion (on the image side) of the air hole 40 is also opened. In this way, even if the flange portion 16b of the image side lens 16 unintentionally comes into close contact with the lens installation surface 35a of the flange portion 35, the air will pass through the air hole 40 and further through a gap between the outer peripheral surface of the flange portion 16b of the image side lens 16 and the inner circumferential surface of the accommodating portion 31, thereby exactly filling the lens barrel 11. Therefore, even if the seal member 37 provided between the object side lens 12 and the inner circumferential surface of the lens barrel 11 is damaged, or is not attached at all, or is not attached to a predetermined position, it is still possible to correctly measure an air leakage, thereby making it possible to exactly check the airtightness of the seal member 37.

the seal member 37 can be checked for its airtightness, by at first sealing the outer peripheral portion from the object side of the lens barrel 11 using a closing member (not shown), followed by filling (from the object side) the lens barrel 11 with air, thus making it possible to complete a checking by measuring an air leakage flow rate of the filled air to the outside of the lens barrel.

Further, the infrared cut filter 36 is installed on the filter installation surface 35b of the flange portion 35, and a part of the outer peripheral edge of the infrared cut filter 36 is disposed in the opening 40d (on the image side) of the air hole 40, and the gap S2 is formed between the outer peripheral edge of the infrared cut filter 36 and the inner circumferential surface of the opening 40d. Therefore, when the infrared cut filter 36 is attached to the filter installation surface 35b using an adhesive, the outgas of the adhesive can escape out of the lens barrel 11 through the gap S2. Thus, it is possible to prevent a fogging (caused due to outgas) of the inner surface of the infrared cut filter 36.

In the present embodiment, the infrared cut filter 36 is installed in the lens unit. However, even if the lens unit does not have such an infrared cut filter, it is still possible to ensure an appropriate checking on the airtightness of the seal member 37.

Moreover, when the air hole 40 is drilled using the drilling tool 50, since the rotation center O of the drilling tool 50 is shifted radially outward from the inner circumferential surface of the accommodating portion 31 of the lens barrel 11, it is possible to reduce an opening area of the end surface 40a (on the object side) of the air hole 40. For this reason, since a relatively large diameter drilling tool 50 can be used, it is possible to inhibit a breakage of the drilling tool 50.

Further, the end surface 40a of the air hole 40 is flush with the lens installation surface 35a, or can be limited within the depth range of the gap S1 formed between the lower surface (image side surface) of the thin portion 16c of the flange portion 16b of the image side lens 16 and the lens installation surface 35a. Accordingly, it is possible to avoid the inner circumferential surface of the accommodating portion 31 of the lens barrel 11 from being chopped by the drilling tool 50. For this reason, since the surface precision of the inner circumferential surface of the accommodating portion 31 is not impaired, it is possible to avoid an impairing on the positional precision (in the radial direction) of the lenses 12-16, the intermediate rings 20-22 and the diaphragm members 25-26 housed in the accommodating portion 31.

Further, since the gap S1 is formed between the lower surface of the thin portion 16c of the flange portion 16b and the lens installation surface 35a, burrs generated when the air hole 40 is drilled by the drilling tool 50 can be released into the gap Sl. Therefore, it is possible to prevent a decrease in positional precision which would be otherwise caused due to burrs on the image side lens 16.

In the present embodiment, the air hole 40 is formed at one position in the circumferential direction of the large diameter portion 11A of the lens barrel 11, but it is also possible to form a plurality of air holes at a plurality of positions.

Further, although the air hole 40 is formed with its axis parallel to the optical axis of the lens barrel, the air hole may also be formed in a manner such that its axis intersects the optical axis of the lens barrel. At this time, the air hole can be formed to include a part of the flange portion 35, while a part of the end portion (on the object side) of the air hole is opened radially inward from the inner circumferential surface of the lens barrel, and at least a part of the end portion (on the image side) of the air hole is opened.

EXPLANATION OF REFERENCE NUMERALS 10 lens unit
11 lens barrel
12-16 lens
12 object side lens
16 image side lens
35 flange portion
35a lens installation surface
35b filter installation surface
36 Infrared cut filter (optical filter)
37 O-ring (seal member)
40 air hole
40a, 40b end faces
40d opening
S2 gap

The invention claimed is:

1. A lens unit comprising:
a plurality of lenses arranged along an optical axis;
a lens barrel in which the plurality of lenses are housed; and
a seal member provided between the inner circumferential surface of the lens barrel and an object side lens positioned closest to the object side among the plurality of lenses, wherein:
the lens barrel has an annular flange portion projecting radially inward on the inner circumferential surface of an end portion of the lens barrel on the barrel's image side; the flange portion having an object side surface facing the object side and an image side surface facing the image side;
an image side lens located closest to the image side among the plurality of lenses is installed on a lens installation surface facing the object side on the flange portion;
the lens barrel is provided with an air hole extending in the thickness direction of the flange portion and covering a part of the flange portion;
a part of the air hole penetrates from the object side surface to the image side surface of the flange portion;
a part of an end portion of the air hole on the object side is opened in a position located radially inward from the inner circumferential surface of the lens barrel on the object side surface of the flange portion; and at least a part of an end portion of the air hole on the image side is opened.

2. The lens unit according to claim 1, wherein:

an optical filter is installed on the filter installation surface facing the image side on the flange portion;

a part of the outer peripheral edge of the filter is disposed at the opening of the air hole on the image side; and a gap is formed between the outer peripheral edge of the optical filter and the inner circumferential surface of the air hole.

3. The lens unit according to claim 1, wherein:

a thin portion is provided on an outer peripheral portion of a flange portion of the image side lens; and the part of the end portion of the air hole on the object side faces a gap formed between the image side surface of the thin portion and the object side surface of the flange portion.

4. A method of manufacturing the lens unit according to claim 1, the method comprising:

stacking the plurality of lenses and the seal member in the lens barrel from the object side; and fixing the object side lens in the lens barrel.

* * * * *